Dec. 7, 1943.  W. L. BREWER, JR  2,336,342
TRAILER BRAKE CONTROL
Filed April 29, 1943   3 Sheets-Sheet 1

Inventor
*William L. Brewer, Jr.*

By *Clarence A. O'Brien
and Hyman Berman*
Attorneys

Dec. 7, 1943.    W. L. BREWER, JR    2,336,342
TRAILER BRAKE CONTROL
Filed April 29, 1943    3 Sheets-Sheet 3

Inventor
William L. Brewer, Jr.

By Clarence A. O'Brien
and Hyman Berman
Attorneys

Patented Dec. 7, 1943

2,336,342

UNITED STATES PATENT OFFICE 2,336,342

TRAILER BRAKE CONTROL

William L. Brewer, Jr., Port Townsend, Wash.

Application April 29, 1943, Serial No. 485,060

3 Claims. (Cl. 188—31)

This invention appertains to new and useful improvements in the general art of brakes and more particularly to an automatic control for trailer brakes, the same being predicated on my forfeited application Serial No. 318,611 and which was filed on the 2nd day of February, 1940.

The principal object of the present invention is to provide automatic means whereby trailer brakes can be automatically operated coincident with the operation of the brakes of the truck or lead vehicle in a substantially foolproof and equalized manner.

Another important object of the invention is to provide a trailer brake control apparatus wherein the mechanism is simple and positive acting in operation.

These and other important objects and advantages of the invention will become apparent to the reader of the following description.

Figure 1:
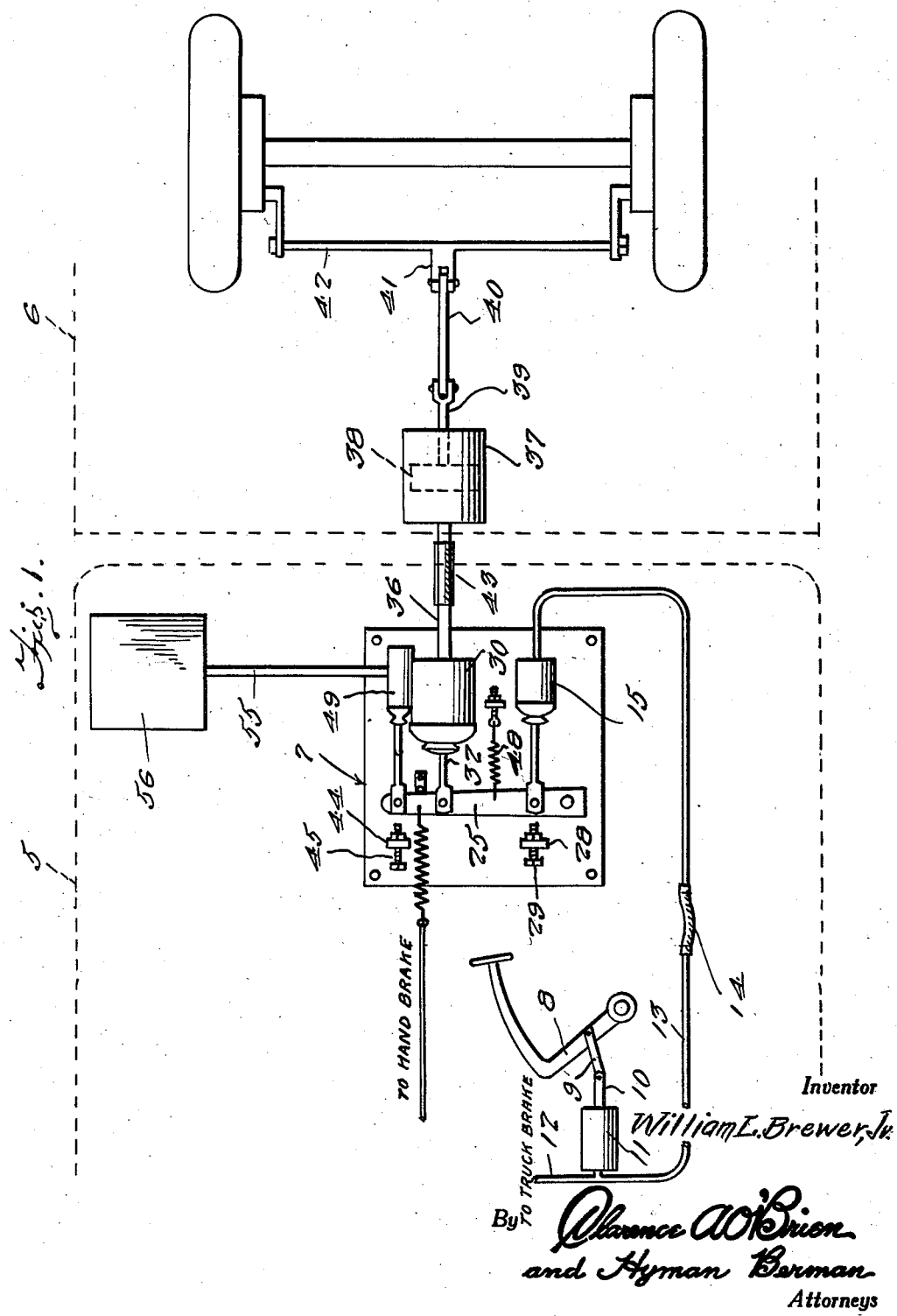
Figure 1 represents a diagrammatic view disclosing the details of the system.

Referring to Figure 1, a diagrammatic view, numeral 5 denotes the truck or lead vehicle while numeral 6 denotes the trailer, these factors being shown in dotted lines. Numeral 7 denotes the automatic control which is mounted on the truck 5. The usual foot pedal is denoted by numeral 8 and has the link connection 9 to the plunger 10 of the master cylinder 11. This cylinder 11 has a piston therein which operates on the fluid line 12 to the truck brakes. A branch line 13 extends to the automatic control means 7 and may have a flexible bridge 14 therein.

Numeral 15 denotes the hydraulic control cylinder which has the piston 16 operative therein. Suitable ears 17 and securing elements 18 secure this cylinder to the base 19. The fluid line 13 extends to the closed end 20 of the cylinder 15. The other end of the cylinder 15 has the threaded plug 21 therein through which the piston rod 22 is operative, this piston rod 22 also operating through the boot 23.

A yoke 24 at the outer end of the rod 22 straddles the beam 25 and is pivotally connected thereto as at 26, this beam being fulcrumed as at 27 to the base 19. A lug 28 rising from the base 19 has the stop screw 29 disposed therethrough and is in the path of the beam 25, this screw 29 being substantially in alignment with the piston rod 22.

Numeral 30 denotes the balance cylinder in which the piston 31 is operative, this piston being provided with the outwardly extending piston rod 32 which is pivotally connected to the free end portion of the beam 25 by the yoke 33 and pivot member 34. This piston rod 32 operates through the boot 35 closing one end of the cylinder 30 while the closed end of the cylinder 30 has the tube 36 extending therefrom to the cylinder 37 on the trailer 6, in which the piston 38 is operative. A rod 39 extends from the piston 38 and is connected by the pivotal link 40 to the arm 41 on the wheel brake operative bar 42. The tube 36 may have a flexible bridge 43 therein.

Rising from the base 9 is the lug 44 through which the second stop screw 45 is adjustable, this being located at the free end portion of the beam 25.

A third lug 46 rises from the base 19 and has the threaded eye-bolt 47 feedable therethrough. A tension spring 48 has one end connected to the eye-bolt 47 and the other end to the intervening portion of the beam 25.

An air valve cylinder 49 contains the piston valve 50 which has the by-pass duct 51 therein capable of communicating the port 52 in the cylinder 30 with the port 53 in the cylinder 49, the latter being open to the atmosphere. The piston valve 50 has the circumferential groove 54 defining a passageway capable of communicating the port 52 with the tube 55 to the vacuum tank 56.

In the operation of the apparatus, the driver depresses the pedal 8 to operate the truck brakes and simultaneously a small amount of fluid passes by way of the conduit 13 to the cylinder 15. This amount of fluid is very slight and results only in a very slight steal of the pedal stroke. The piston 16 in the cylinder 15 responding to the effect of the fluid operates the beam 25. Due to the pivotal connection 26 of the piston rod 22 with the beam 25 adjacent the fulcrum 27 requires only about a one-thirty-second of an inch movement of the beam 25 to sufficiently actuate the piston 50 which is in the nature of a valve controlling the vacuum line from the brake operating cylinder 37 (see Figure 1) to the vacuum tank 56. It can, therefore, be seen that when the groove 54 of the piston valve 50 is communicating the cylinder 30 and pipe 36 with the vacuum tank pipe 55, the piston 38 in the cylinder 37 is being moved forwardly (see Figure 1) to operate the trailer brakes.

Figure 2:
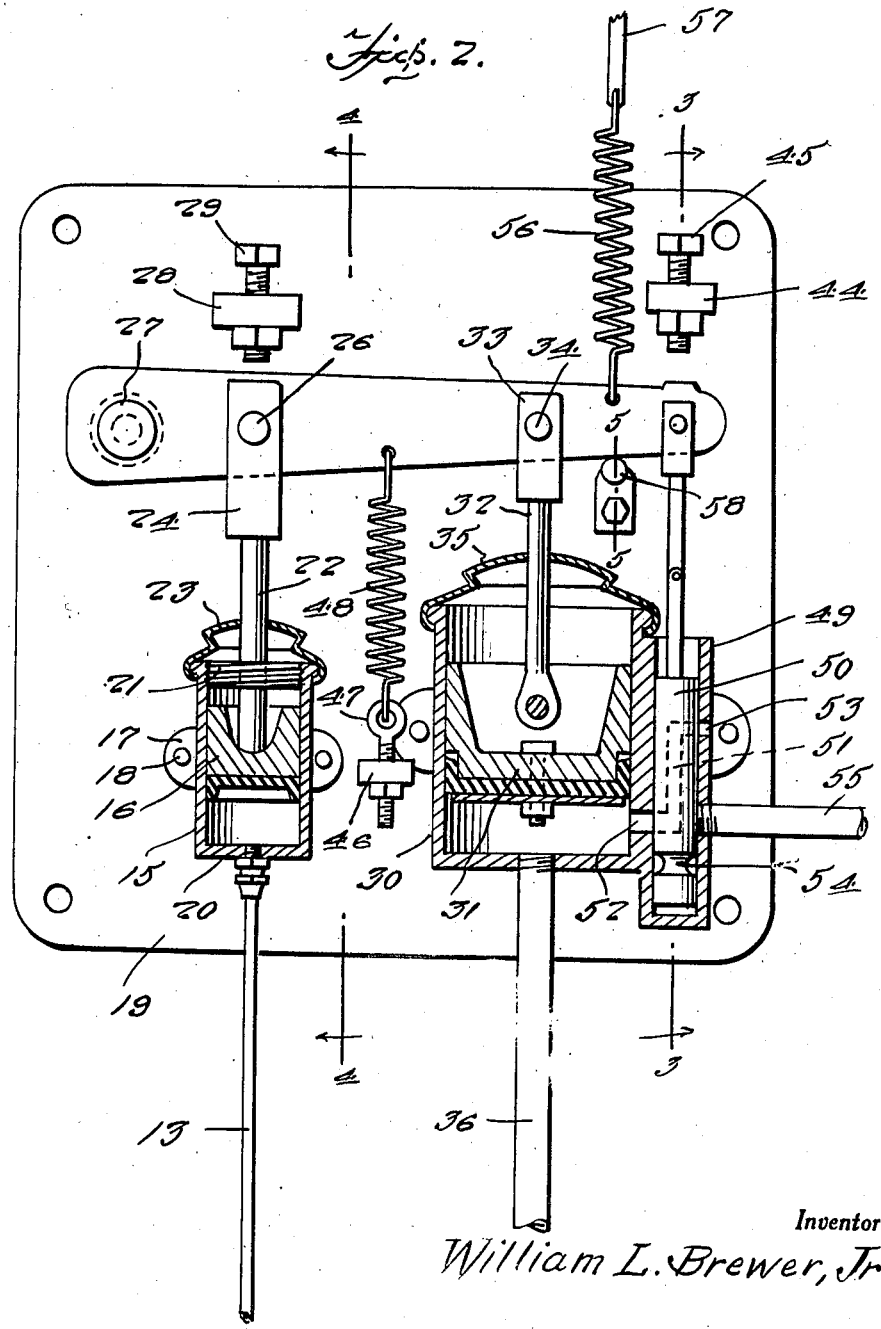
Figure 2 is a top plan view with certain elements in section, showing the automatic control.
Figure 3:
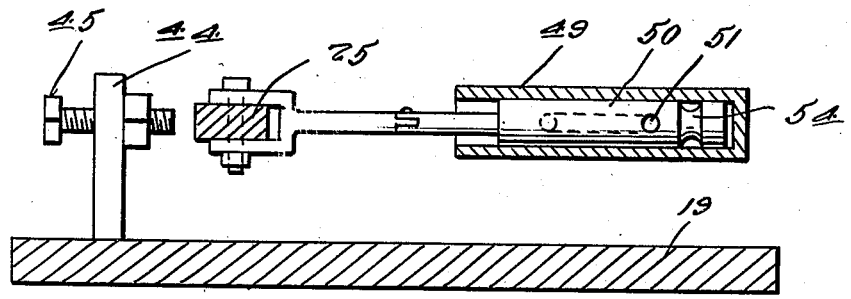
Figure 3 is a section on the line 3—3 of Figure 2.
Figure 4:
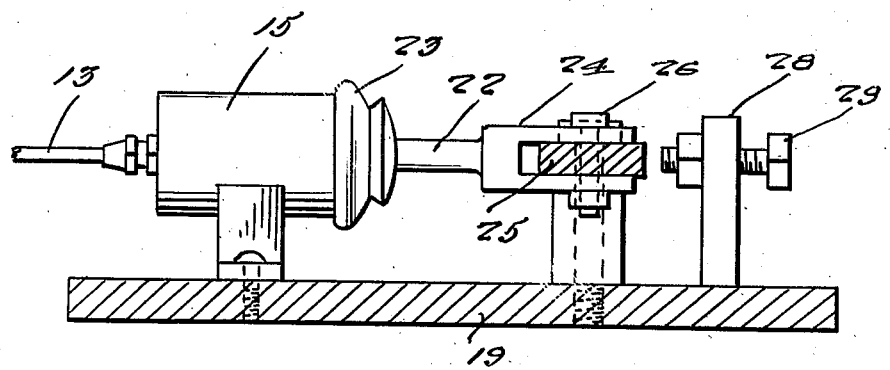
Figure 4 is a section on the line 4—4 of Figure 2.
Figure 5:
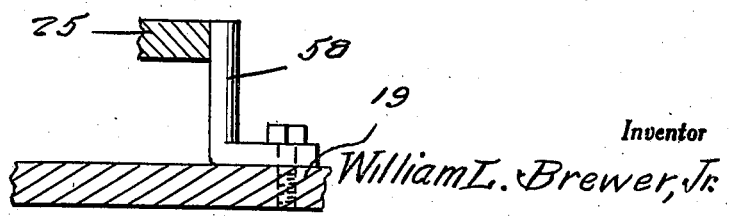
Figure 5 is a fragmentary enlarged detailed sectional view taken substantially on a line 5—5 of Figure 2.

Depending upon the depression of the pedal 8 and the corresponding location of the piston in the cylinder 30, the vacuum will take effect on the piston 31 pulling the same downwardly in Figure 2, operating the beam 25 and moving the piston 16 to restore the above referred to small amount of fluid to the cylinder 11. Thus the piston 50 will have its duct 51 communicating the cylinder 30 with the atmosphere so that air can enter the cylinder 37 and permit the brakes to move to unapplied position. Of course, this action takes place gradually and depending upon the operation of the pedal 8.

By decreasing or increasing the tension of spring 48 by the adjusting means 46, the brake control valve can be set to lead or lag, or perfectly coordinate with the brakes on the towing vehicle.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In combination a towing vehicle brake, a trailer brake, and automatic control means for operating the trailer brake simultaneously with the operation of the towing vehicle brake; said towing vehicle brake including a fluid pressure line and a master cylinder, a beam fulcrumed at one end, a fluid pressure unit in connection with the fluid pressure line and attached to the beam to operate the beam when subject to said pressure in the line, vacuum effecting means, a vacuum cylinder including a piston in connection with the beam, a two-way valve including an element in connection with the beam and being interposed between the vacuum effecting means and the vacuum cylinder, a communicating line between the vacuum cylinder and the trailer brake, said beam being operative by the fluid pressure unit to move the valve element to a position communicating the vacuum effecting means with the vacuum cylinder.

2. In combination a towing vehicle brake, a trailer brake, and automatic control means for operating the trailer brake simultaneously with the operation of the towing vehicle brake; said towing vehicle brake including a fluid pressure line and a master cylinder, a beam fulcrumed at one end, a fluid pressure unit in connection with the fluid pressure line and attached to the beam to operate the beam when subject to said pressure in the line, vacuum effecting means, a vacuum cylinder including a piston in connection with the beam, a two-way valve including an element in connection with the beam and being interposed between the vacuum effecting means and the vacuum cylinder, a communicating line between the vacuum cylinder and the trailer brake, said beam being operative by the fluid pressure unit to move the valve element to a position communicating the vacuum effecting means with the vacuum cylinder, the piston in the vacuum cylinder being operative when subjected to the effect of a vacuum to move the beam and valve element to a position shutting off the vacuum effecting means from the vacuum cylinder.

3. In combination a towing vehicle brake, a trailer brake, and automatic control means for operating the trailer brake simultaneously with the operation of the towing vehicle brake; said towing vehicle brake including a fluid pressure line and a master cylinder, a beam fulcrumed at one end, a fluid pressure unit in connection with the fluid pressure line and attached to the beam to operate the beam when subject to said pressure in the line, vacuum effecting means, a vacuum cylinder including a piston in connection with the beam, a two-way valve including an element in connection with the beam, and being interposed between the vacuum effecting means and the vacuum cylinder, a communicating line between the vacuum cylinder and the trailer brake, said beam being operative by the fluid pressure unit to move the valve element to a position communicating the vacuum effecting means with the vacuum cylinder, and spring means associated with the beam for moving the beam to a position to hold the valve element in a position to permit atmospheric pressure to build up in the vacuum cylinder.

WILLIAM L. BREWER, Jr.